L. BORKHUIS.
GAMBREL.
APPLICATION FILED JULY 15, 1913. RENEWED FEB. 2, 1915.
1,150,331.
Patented Aug. 17, 1915.
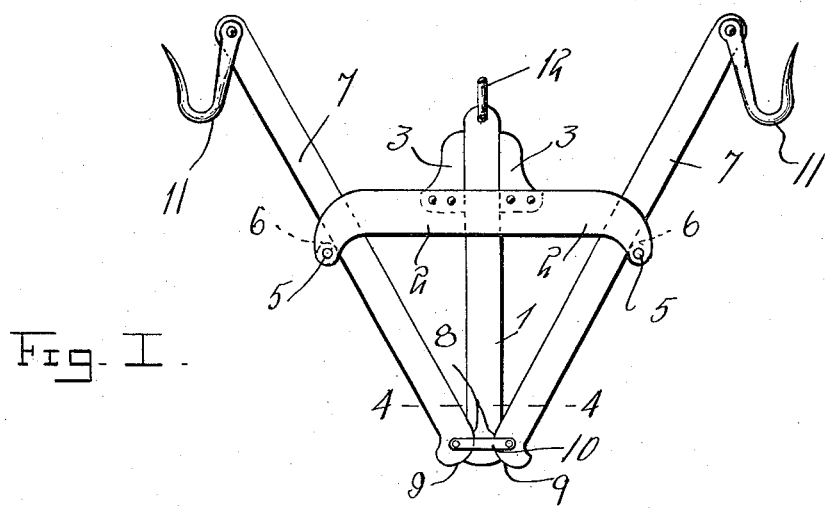
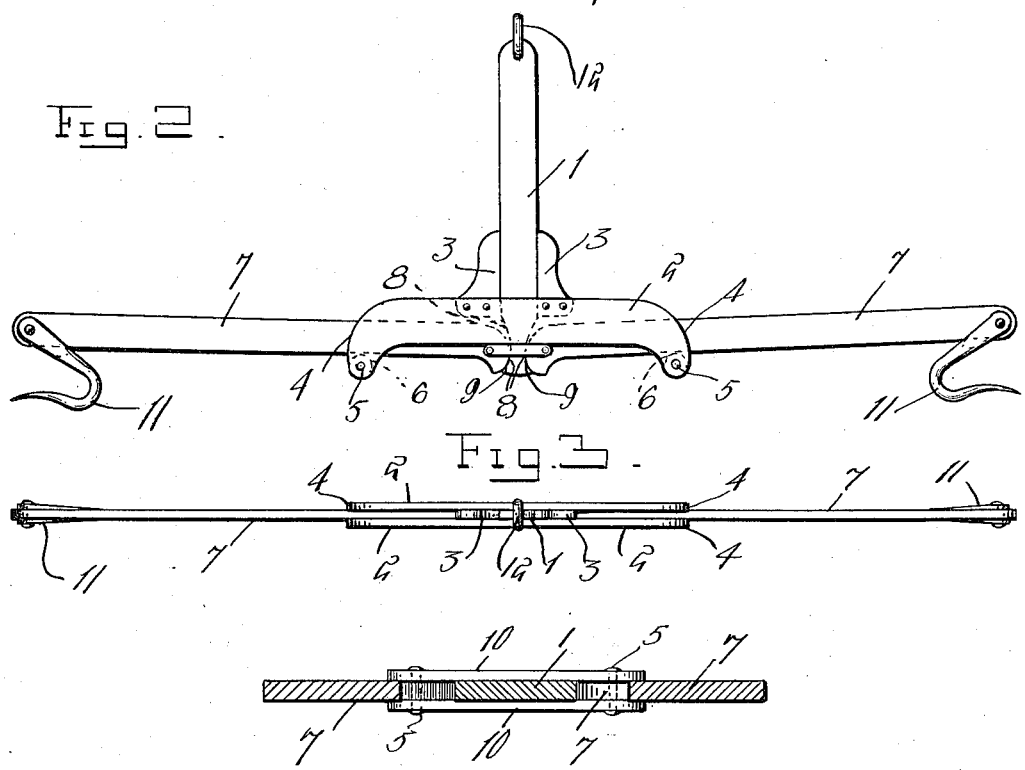
Witnesses
Inventor
L. Borkhuis.
By Chandler & Chandler
Attorneys
COLUMBIA PLANOGRAPH CO., WASHINGTON, D. C.

UNITED STATES PATENT OFFICE.

LOUIS BORKHUIS, OF VAYLAND, SOUTH DAKOTA.

GAMBREL.

1,150,331.  Specification of Letters Patent.  Patented Aug. 17, 1915.

Application filed July 15, 1913, Serial No. 779,184. Renewed February 2, 1915. Serial No. 5,780.

*To all whom it may concern:*

Be it known that I, LOUIS BORKHUIS, a citizen of the United States, residing at Vayland, in the county of Hand, State of South Dakota, have invented certain new and useful Improvements in Gambrels; and I do hereby declare the following to be a full, clear, and exact description of the invention, such as will enable others skilled in the art to which it appertains to make and use the same.

The present invention is directed to improvements in gambrels, and has for its object to so construct a device of this character that the same can be folded for engaging the carcass, after which the weight thereof will induce the arms to spread, thus effectually supporting the carcass.

With this and other objects in view, this invention resides in the novel features of construction, formation, combination and arrangement of parts to be hereinafter more fully described, claimed and illustrated in the accompanying drawing, in which:—

Figure 1 is a side elevation of the device, the same being shown in its inoperative position. Fig. 2 is a similar view showing the same in its operative position. Fig. 3 is a plan view of Fig. 2. Fig. 4 is a sectional view on line 4—4 of Fig. 1.

Referring to the drawing, the numeral 1 designates the main bar, which is vertically disposed and adapted for sliding movement between the bars 2, said bars being held in spaced parallel relation by blocks 3 which are spaced apart sufficiently to permit the bar 1 to pass therebetween.

The outer ends of the bars 2 are turned downwardly, as at 4, and support axles 5 upon which are rotatably mounted anti-friction sleeves 6 which are engaged by the arms 7 which are designed to slide between the bars 2.

The bar 1 has its lower end provided with diametrically disposed curved recesses 8 which are engaged by the curved edges 9 formed upon the lower ends of the arms 7, said edges being retained in the recesses 8 by the links 10 which have their outer ends pivotally connected to the lower ends of the arms 7, and concentric with the curved edges 9.

The upper ends of the arms 7 are provided with pivotally connected hooks 11 which are adapted to engage the legs of the carcass when the device is in operation.

Connected to the upper end of the bar 1 is a ring 12 for engagement by a pulley block or the like so that the device can be easily elevated.

From this construction it will be seen that when the hooks 11 are engaged with the legs of the carcass and the bar 1 is moved upwardly the weight of the carcass will induce the arms 7 to spread until they assume the position as shown in Fig. 2, thus effectually spreading the carcass so that it can be operated upon.

What is claimed is:—

A gambrel comprising a main vertical bar, spaced bars between which the main bar passes, said spaced bars having anti-friction sleeves carried at their outer ends, the lower end of the main bar being provided with curved recesses, arms having their lower ends provided with curved edges adapted to movably engage said recesses, links pivotally connecting the lower ends of said arms to retain the curved edges thereof in said recesses, said arms being passed between the spaced bars and engaging the anti-friction rollers, the upward and downward movement of the curved edges of the arms being limited by the recesses, and hooks pivotally connected to the upper ends of said arms.

In testimony whereof, I affix my signature, in the presence of two witnesses.

LOUIS BORKHUIS.

Witnesses:
CHAS. OLSEN,
R. H. JONES.

Copies of this patent may be obtained for five cents each, by addressing the "Commissioner of Patents, Washington, D. C."